United States Patent [19]

Smith

[11] Patent Number: 5,893,648
[45] Date of Patent: Apr. 13, 1999

US005893648A

[54] COMBINED BEARING AND SENSOR ASSEMBLY

[75] Inventor: Douglas H. Smith, Sundhoffen, France

[73] Assignee: The Timken Company, Canton, Ohio

[21] Appl. No.: 08/903,125

[22] Filed: Jul. 30, 1997

[30] Foreign Application Priority Data

Jul. 30, 1996 [GB] United Kingdom ............... 9615941

[51] Int. Cl.$^6$ ................................. F16C 19/00
[52] U.S. Cl. ........................................ 384/448
[58] Field of Search ................ 384/448; 324/166, 324/173, 207.25

[56] References Cited

U.S. PATENT DOCUMENTS

| | | | |
|---|---|---|---|
| 4,259,637 | 3/1981 | Bloomfield et al. | 324/166 |
| 4,505,396 | 3/1985 | Hedlund et al. | 212/223 |
| 4,946,295 | 8/1990 | Hajzler | 384/448 |
| 4,946,296 | 8/1990 | Olschewski et al. | 384/448 |
| 5,063,346 | 11/1991 | Hogan et al. | 324/173 |
| 5,097,701 | 3/1992 | Nantua et al. | 73/118.1 |
| 5,143,458 | 9/1992 | Alff et al. | 384/448 |
| 5,293,124 | 3/1994 | Caillaut et al. | 324/173 |
| 5,372,435 | 12/1994 | Genero et al. | 384/448 |
| 5,421,654 | 6/1995 | Rigaux et al. | 384/448 |
| 5,438,260 | 8/1995 | Rigaux et al. | 324/166 |
| 5,458,420 | 10/1995 | Otto | 384/443 |
| 5,564,839 | 10/1996 | Ouchi et al. | 384/448 |
| 5,567,058 | 10/1996 | Morita et al. | 384/448 |
| 5,603,575 | 2/1997 | Ouchi | 384/448 X |
| 5,628,470 | 5/1997 | Sahashi et al. | 384/448 |
| 5,725,316 | 3/1998 | Barbero et al. | 384/448 |

FOREIGN PATENT DOCUMENTS

| | | |
|---|---|---|
| 0597238A1 | of 1994 | European Pat. Off. . |
| 511107 | 6/1995 | European Pat. Off. . |
| 2718499 | 10/1995 | France . |
| 4231033A1 | of 1993 | Germany . |
| 4206910 | 7/1993 | Germany . |
| 1 9535272 | 4/1997 | Germany . |
| 8122351 | 5/1996 | Japan . |
| 1504792 | of 1978 | United Kingdom . |
| 2249397 | of 1992 | United Kingdom . |
| 2273329 | 6/1994 | United Kingdom . |
| 2292193 | 2/1996 | United Kingdom . |
| 9715833 | 5/1997 | WIPO . |

Primary Examiner—Thomas R. Hannon
Attorney, Agent, or Firm—Polster, Lieder, Woodruff & Lucchesi, L.C.

[57] ABSTRACT

A combined bearing and sensor assembly comprises a sensor unit 30 and a bearing unit 40. The sensor unit 30 includes a coupling ring 10 which has a radially inwardly directed lip 22 which engages with a groove 11 formed in the inner raceway 18 of the bearing unit 40. The coupling ring 10 also has an axially extending portion 5, the radially inwardly facing surface of which engages with a sensor unit mounting surface 8a such that the sensor unit's engagement to the mounting surface 8a is greater than its engagement to the bearing unit 40. In this way the combined bearing and sensor unit may be sold, transported and fitted as a single unit, but will separate to allow the sensor unit 30 to remain properly mounted when the bearing unit 40 is dismounted for general maintenance purposes.

21 Claims, 7 Drawing Sheets ately achieved and maintained; secondly, it is inconvenient for vehicle manufacturers who must ensure that the correct sensors are used with the correct bearing units. Manufacturers would generally prefer to buy and mount a combined

COMBINED BEARING AND SENSOR ASSEMBLY

CROSS-REFERENCE TO RELATED APPLICATIONS

STATEMENT REGARDING FEDERALLY SPONSORED RESEARCH OR DEVELOPMENT

Not Applicable.

BACKGROUND OF THE INVENTION

The present invention relates to a combined bearing and sensor assembly, and in particular to an assembly suitable for use in anti-lock braking systems.

Anti-lock braking systems generally require the use of sensors located close to individual bearings to monitor the speed of rotation of the bearings, for example, by measuring the speed at which the outer race rotates relative to a shaft on which both the sensor and the inner race of the bearing are mounted. A typical sensor and bearing assembly of this type has a tone ring which is connected to, and rotates with, the outer race. The tone ring has a number of separate regions (for example magnetized regions) evenly spaced about the tone ring which are detectable as they pass close by the sensor. The frequency with which these regions are detected by the sensor can then be used to determine the speed of rotation of the outer race of the bearing. In practice, the rotation of the tone ring close to the sensor causes the sensor to generate an electrical signal whose frequency is proportional to the angular velocity of the tone ring and hence the outer race.

It is generally preferred to use as small a sensor as possible so as to minimize the total size of the combined bearing and sensor assembly. However, it has been discovered that if a small sensor is used, the air gap between the sensor and the tone ring must be very small and must be maintained at a specific thickness with only a very small acceptable margin before the separation becomes too large or too small; that is to say the gap between the sensor and the tone ring must be maintained to a very close tolerance. It has also been discovered, somewhat surprisingly, that even if the sensor is held in place with a coupling ring which engages, for example, a shaft onto which the bearing and sensor are to be mounted with a tight interference fit, the coupling ring, and thus the sensor, may still move axially along the shaft during normal usage of the bearing such that the air gap alters. Where a relatively small sensor is used such movement, and the consequent alteration of the air gap, may be sufficient to adversely affect the operation of the sensor.

Conventionally, sensor units for use in, for example, anti-lock braking systems, have been sold and mounted separately from the bearing assembly. The fact that the sensor unit is separate from the bearing assembly is advantageous because this allows the bearing assembly to be dismounted periodically for maintenance of the bearing assembly. It also has a number of associated disadvantages. Firstly, it requires two mounting steps rather than just the one step involved in mounting a conventional (non-anti-lock braking system) bearing assembly, and the mounting of the two separate units is not straightforward since the gap between the sensor and the tone ring must be very accur bearing and sensor assembly. The present invention seeks to provide a combined bearing and sensor assembly and a method of mounting a combined bearing and sensor assembly which overcomes one or more of the disadvantages associated with the prior art discussed above.

According to a first aspect of the present invention there is provided a combined bearing and sensor assembly for mounting on a mounting surface, said assembly comprising a bearing unit which includes sensor unit engaging means, and a sensor unit which includes a sensor coupling ring having bearing unit engaging means, the assembly being characterized by the sensor unit coupling ring further having preferential mounting surface engaging means, whereby said sensor unit engaging means engages with said bearing unit engaging means when said combined bearing and sensor assembly is not mounted on a mounting surface, and said sensor coupling ring engages with the mounting surface in preference to the bearing unit when said combined bearing and sensor assembly is mounted on a mounting surface, said sensor coupling ring engaging the mounting surface by means of said preferential mounting surface engaging means, thus allowing said bearing unit to be dismounted from and remounted onto said mounting surface without removal or substantial disturbance of the sensor unit.

Reference herein to a mounting surface will be understood as reference to any surface suitable for mounting a sensor unit and/or a bearing unit in, on or around, such as is typically found on axles, axle tubes and bearing housings for example.

Ideally, the preferential mounting surface engaging means is connected to the bearing unit engaging means so as to disengage the bearing unit engaging means for the sensor unit engaging means, or, at least, to weaken the engagement, as the combined bearing and sensor assembly is mounted on a mounting surface. In a currently preferred embodiment, the sensor coupling ring is at least in part substantially rotationally symmetrical about a central axis, and includes a generally axially extending first portion, which forms the preferential mounting surface engaging means and whose radially inner surface engages the mounting surface on, for example, an axle or axle tube on which the combined bearing and sensor assembly is to be mounted. In this currently preferred embodiment, a radially inwardly directed lip, the radially inner end of which forms the bearing unit engaging means, is formed on the free end (i.e. the end adjacent to the bearing unit) of the first portion.

The sensor unit engaging means of the bearing unit may take the form of a cooperating surface which is engageable with the bearing unit engaging means, the sensor coupling ring being so constructed and arranged that the bearing unit engaging means is urged radially inwardly into a firm contact with the cooperating surface when the combined bearing and sensor assembly is not attached to a mounting surface on, for example, an axle or axle tube. The first portion is preferably shaped such that when the sensor coupling ring is mounted onto an axle or axle tube, the radially inwardly directed lip is deflected radially outwardly by a small amount such that the engagement between the bearing unit engaging means and the sensor unit engaging means is at least reduced.

The first portion of the coupling ring may be connected to a radially outwardly extending backing portion having an axially directed flange arranged concentrically with the first portion whereby a sensor may be held in place between the flange and the radially outer surface of the first portion.

In order to increase the deflection of the bearing unit engaging means on mounting the coupling ring on a mounting surface, the coupling ring preferably has slits extending axially inwardly from the free end thereof. Furthermore, the coupling ring may include one or more dedicated cam surfaces which cooperate with the mounting surface to increase the radial deflection of the bearing unit engaging means. Typically, the mounting surface on which the combined bearing and sensor assembly is to be mounted will have a slightly tapered free end, and one of the dedicated cam surfaces may advantageously take the form of a radially directly, rounded ring-like protrusion formed adjacent the free end of the preferential mounting surface engaging means, which protrusion engages said tapered portion of the mounting surface. Ideally, the dedicated cam surfaces and the slits are both formed on the sensor coupling ring, their cumulative effects greatly enhancing the operation of the coupling ring.

Preferably, the sensor unit and the bearing unit are so configured that as they are brought together, permanent opposing abutment surfaces formed on the sensor and bearing units abut one another, thus preventing further relative movement of the units toward one another when the air gap between the tone ring and the sensor is of a predetermined size. The opposing abutment surfaces may conveniently be formed on the bearing unit engaging means and the sensor unit engaging means respectively.

Where it is intended that the sensor unit should be dismountable and remountable separately from the bearing unit, the coupling ring may further include stop means to prevent the sensor unit from being pushed too far onto the mounting surface during re-mounting, by engaging with an axially outward facing surface formed on the member, such as an axle or axle tube, onto which the sensor unit is to be remounted, when the sensor unit is in the correct position on the mounting surface. Where the bearing unit engaging means takes the form of a radially directed lip, the axially outwardly facing surface formed on one side of the lip may provide one of the opposing abutment surfaces, while the other side of the lip may provide the stop means.

According to a second aspect of the present invention there is provided a method of mounting a bearing assembly onto a mounting surface comprising the steps of releasably engaging a sensor unit having a sensor to a bearing unit having a tone ring so as to maintain a fixed gap between the sensor and the tone ring, the bearing unit and the sensor unit together forming a combined bearing and sensor assembly, and mounting the combined bearing and sensor assembly on the mounting surfaces, said sensor unit being provided with bearing unit engaging means and the method being characterized in that the sensor unit is further provided with preferential mounting surface engaging means, and in that said method further including the step of deflecting the bearing unit engaging means simultaneously with the step of mounting the combined bearing and sensor assembly, such that the engagement between the sensor unit and the bearing unit is weakened while the engagement between the combined bearing and sensor assembly and the mounting surface is increased, whereby the bearing unit may be dismounted from and remounted onto the mounting surface without disturbing the sensor unit.

Preferably, the mounting surface comprises at least a sensor unit mounting surface portion in, on or around which the sensor unit is mounted, and a bearing unit mounting surface portion, in on or around which the bearing unit is mounted. The bearing unit mounting surface portion could conveniently be axially longer than the sensor unit and thus act as a piloting means for ensuring correct alignment of the sensor unit with respect to the sensor unit mounting surface portion during mounting of the combined bearing and sensor assembly.

According to a third aspect of the present invention there is provided a combined bearing and sensor assembly for mounting on a mounting surface, the assembly comprising a bearing unit including a tone ring and a reference surface having a fixed axial relationship to the tone ring; and a sensor unit including an axial sensor and a sensor coupling ring; the assembly being characterized in that the sensor coupling ring includes an abutment surface, having a fixed axial relationship to the sensor, for abutment with the reference surface, preferential mounting surface engaging means for enabling the bearing unit to be dismounted from and re-mounted onto the mounting surface without removal or substantial disturbance of the sensor unit, and axial anchorage means, wherein the axial anchorage means cooperates with the mounting surface to ensure that the abutment surface of the coupling ring remains in abutment with the reference surface of the bearing unit when the sensor unit and the bearing unit have been correctly mounted even after substantial operation of the combined bearing and sensor assembly, whereby the axial gap between the sensor and the tone ring is maintained substantially constant.

According to the third aspect of the present invention it is not necessary for the bearing unit and the sensor unit to be sold and mounted as a combined unit. However, they cooperate with one another once they have been mounted by means of the abutment between the abutment surface and the reference surface and in this way they may be considered as forming a combined bearing and sensor assembly.

In the present context, the term "axial sensor" refers to a sensor which is axially separated from the tone ring such that a small axial air gap exists between the tone ring and the axial sensor. Radial sensors also exist in which the sensor is radially separated from the tone ring, however, the third aspect of the present invention is not concerned with such arrangements.

The axial anchorage means may cooperate directly with the mounting surface, or alternatively it may cooperate indirectly with the mounting surface of an intermediate member such as a carrier ring.

Preferably the axial anchorage means takes the form of a radially directed lip, or at least one radially directed protrusion, which located, when the combined bearing and sensor assembly is correctly mounted on the mounting surface, between the bearing unit and the mounting surface. Preferably the abutment surface is formed by an outer axially facing surface formed on the axial anchorage means. Where the assembly further incorporates an intermediate member such as a carrier ring, the axial anchorage means preferably locates between the intermediate member and the bearing unit.

The axial anchorage means ideally locates in an end groove formed either in the bearing unit or in the mounting surface (or, where appropriate, in the intermediate member). The end groove preferably extends radially only as far as the radial length of the axial anchorage means, where the majority of the axial stress between the bearing unit and the mounting surface is transmitted by direct abutment between a backface of the bearing unit and an opposing surface of the mounting surface (or intermediate member where appropriate) radially beyond the groove.

Preferably the axial anchorage means includes stop means having a limited amount of give and being adapted to engage the mounting surface (or intermediate member where appropriate) during mounting of the assembly as a result of the abutment between the abutment surface and the reference surface, shortly before the backface of the bearing unit abuts the opposing surface of the mounting surface (or intermediate member where appropriate), wherein the stop means has sufficient give to permit the backface of the bearing unit to continue to move into abutment with the opposing surface of the mounting surface (or intermediate member where appropriate) during mounting of the assembly without damaging the sensor unit, but insufficient give to enable the sensor unit to move axially away from the reference surface during normal usage of the bearing assembly, once the bearing assembly has been correctly mounted. In this way, the stop means acts to take up any excess axial freedom of movement of the sensor unit when the assembly is correctly mounted on the mounting surface. Such freedom of movement may, for example, result from manufacturing the axial anchorage means to have a slightly narrower axial width than the end groove in which it is to locate, so as to allow for small variations in these widths which result from the machining of these features being achievable only to within certain well known tolerances.

BRIEF DESCRIPTION OF THE SEVERAL VIEWS OF THE DRAWINGS

In order that the present invention may be better understood embodiments thereof will now be described by way of example only with reference to the accompanying drawings, in which.

DETAILED DESCRIPTION OF THE INVENTION

Figure 1:
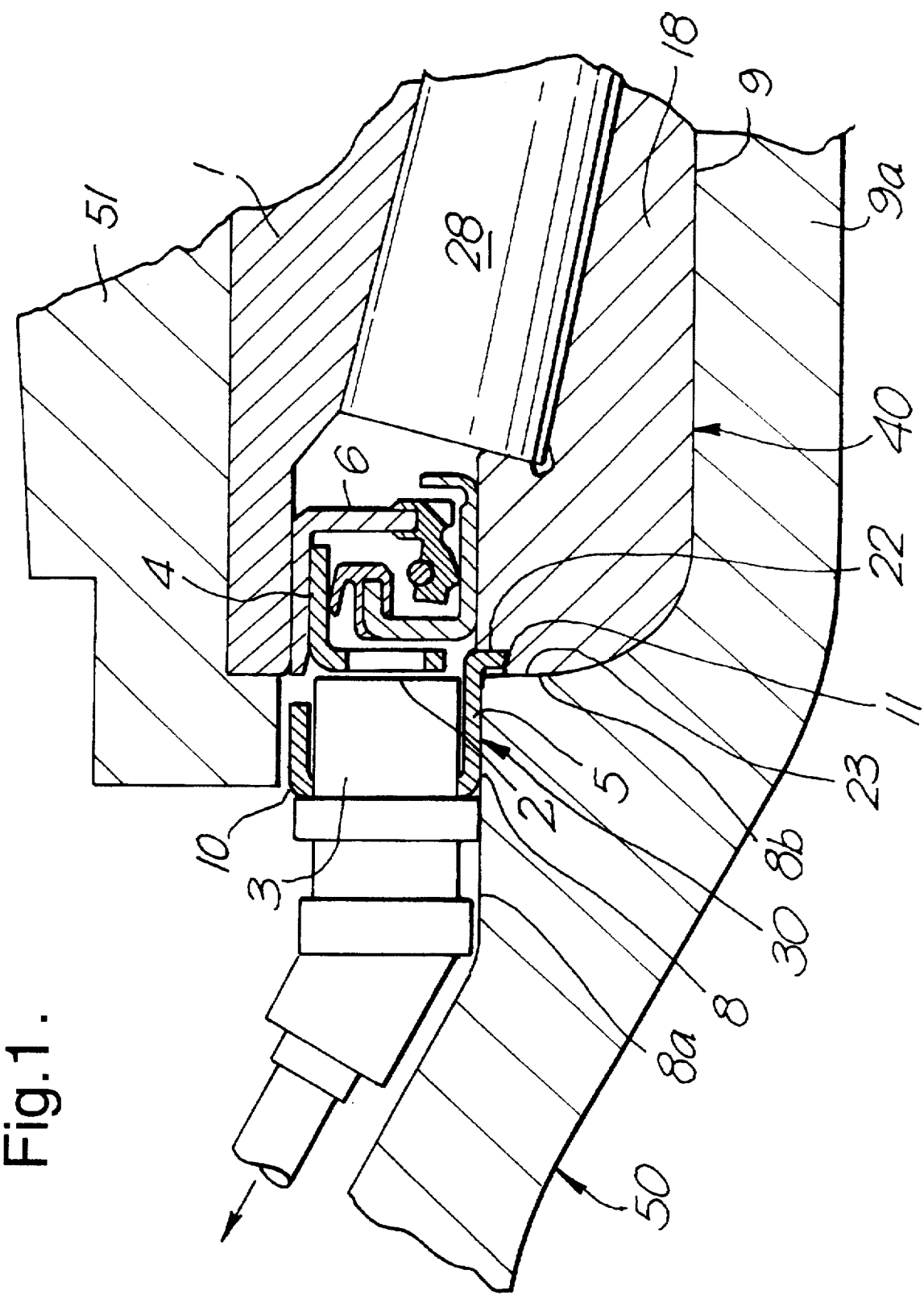
FIG. 1 is a diagrammatical part cross-sectional view of a combined bearing and sensor assembly according to the present invention mounted on an axle tube.

Referring firstly to FIGS. 1 to 4, the combined bearing and sensor assembly comprises a sensor unit 30 and an anti-friction bearing unit 40. The combined bearing and sensor assembly 30,40 is shown mounted on a bearing mount in the form of an axle tube 50 having a spindle 9a and a shoulder 8 with the shoulder 8 having a radially outward facing surface 8a and an axially outward facing surface 8b. The spindle 9a provides a bearing unit mounting surface 9, the radially outward facing surface 8a forms a sensor unit mounting surface and the axially outward facing surface 8b forms an opposing surface which, as is discussed in greater detail below, acts to oppose excessive axial movement of both the bearing unit and the sensor unit. Collectively, the three surfaces 8a, 8b, 9 form the mounting surface 8a, 8b, 9. The sensor unit 30 essentially comprises a sensor 3 held within a sensor coupling ring 10, while the bearing unit 40 is essentially conventional and includes an inner race 18 and an outer race 1 with rolling elements 28 therebetween and a seal 6. The outer race is press-fitted into a hub 51 which rotates with the outer race 1. The combined bearing and sensor assembly is for use in an anti-lock brake system, and the seal 6 also includes a tone ring 4 which has a number of regions (for example magnetized regions or apertures) evenly spaced about the tone ring 4 which are detectable by the sensor 3 as they pass close by.

The sensor coupling ring 10 is preferably created out of a stamped and machined piece of metal and is substantially rotationally symmetrical about a central axis. The coupling ring 10 includes a substantially axially extending first portion 5, which forms a preferential mounting surface engaging means, the radially inner surface of which (having an internal diameter 20, see FIG. 3) engages the outer surface 8a (having an external diameter 21, see FIG. 2) of the shoulder 8 of the axle tube 50. When the coupling ring 10 is not mounted on the axle tube shoulder 8, the first portion 5 may be cylindrical. Alternatively, the first portion 5 may taper slightly towards its free end (i.e. the end adjacent the bearing unit 40 as shown in FIG. 1) such that its internal diameter 20 is slightly smaller at this end than at its other end.

Figure 3:
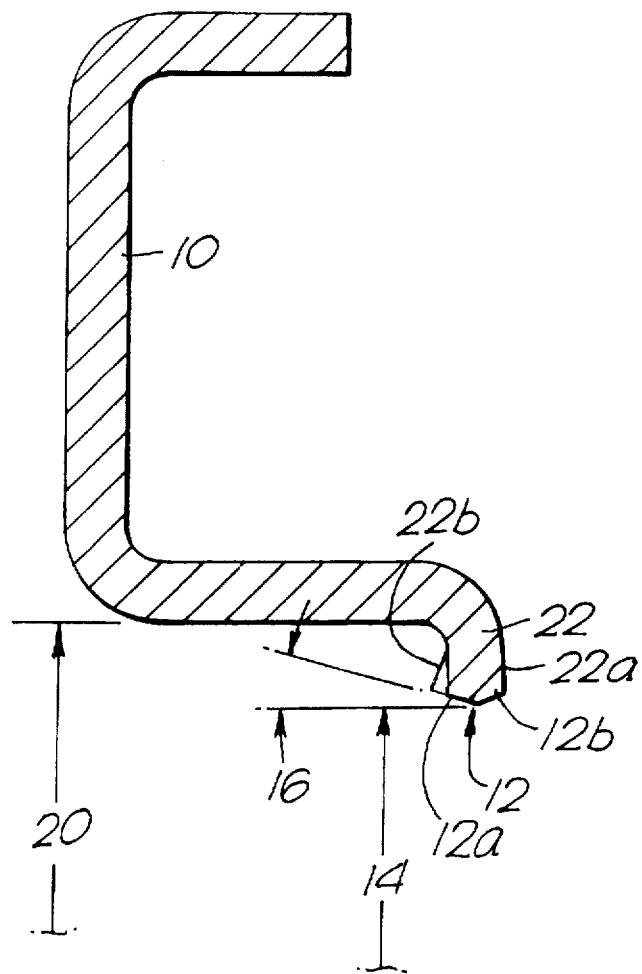
FIG. 3 is a diagrammatical cross-sectional view of the sensor coupling ring shown in FIGS. 1 and 2.
Figure 4:
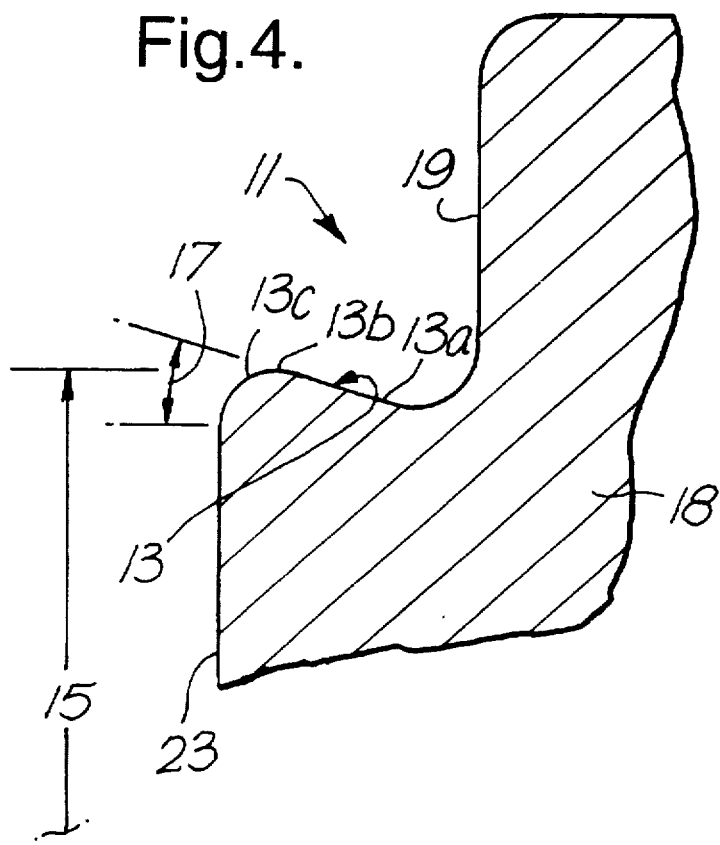
FIG. 4 is an enlarged view of the co-pending surface formed on the bearing unit shown in FIGS. 1 and 2.

An axial anchorage means is provided in the form of a radially inwardly directed lip 22 on the free end of the first portion 5 of the coupling ring 10. The radially inwardly directed lip 22 having an axially outward facing abutment surface 22a, has a radially inner end which forms a bearing unit engaging means or surface 12. Referring to FIG. 3, the engaging surface 12 of the lip 22 comprises a radially inwardly tapering portion 12a and a radially outwardly tapering portion 12b. The lip 22 clips into an inner race groove 11 which acts as a sensor unit engaging means, having a cooperating surface to engage with the bearing unit engaging surface 12, and in particular the radially inwardly tapering portion thereof.

The lip 22 also has one or more axially inwardly projecting portions 22b, which together form stop means, approximately evenly rotationally spaced around the circumference of the lip. The stop means 22b may be conveniently formed by stamping the lip 22 prior to machining the radially inwardly and outwardly tapering surfaces 12a, 12b around the rest of the lip 22. Each projecting portion 22b initially projects radially inwardly sufficiently far that the maximum axial distance between the axially outwardly facing surface 22a of the lip 22 and the axially inwardly (pointing tip) leading edge of the projecting portion 22b is greater than the axial width of the groove 11. In this way, when the sensor unit 30 is attached to the bearing unit 40, prior to mounting the combined assembly, the axially (pointing tip) inwardly leading edge of each projecting portion 22b projects axially inwardly beyond the axially inward facing surface of the inner race 18.

Figure 2:
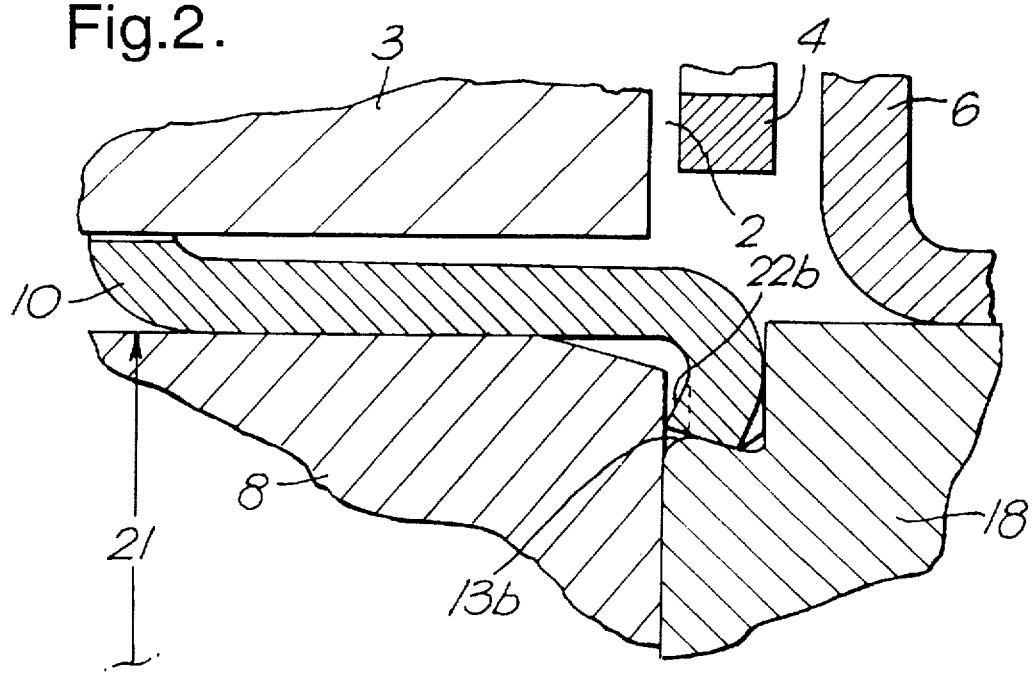
FIG. 2 is an enlarged cross-section view of a part of the combined bearing and sensor assembly of FIG. 1, showing a stop means formed on the coupling ring of the sensor unit.

Each projecting portion 22b, however, is sufficiently deformable and/or resilient that when the combined bearing and sensor assembly is mounted, for example, on an axle tube 50 as shown in FIGS. 1 and 2, the stop means is pressed by the axially outward facing surface 8b axially outwardly until it is substantially flush with the axially inward facing surface or backface 23 of the inner race 18. This in turn ensures that the axially outward facing surface of the lip 22 is constantly urged against a substantially axially facing abutment surface 19 formed by the inner race groove 11. This is important as it ensures that the (maximum) spacing between the tone ring 4 and the sensor 3 is accurately set and maintained as a result of mounting the combined bearing and sensor assembly. The stop means 22b also acts to ensure that if the sensor unit 30 is dismounted, it may be remounted into the correct position on its mounting surface without pushing the sensor unit too far axially inwardly.

The inner race groove 11 is located on the outside diameter of the inner race 18 of the anti-friction bearing unit 40. As is most clearly seen in FIG. 4, the inner race groove 11, defines a substantially radially outward facing inner race groove surface 13, and a reference surface in the form of a substantially axially facing abutment surface 19, which abutment surface 19 faces the sensor unit 3 when in use. Formed on the other side of the inner race groove surface 13 is the backface 23 of the inner race 18 of the bearing unit 40. At the shoulder between the backface 23 and the inner race groove surface 13 there is a small radial protrusion 13b with smoothly curved radially inwardly extending surfaces tapering away on either side to form a cam surface 13c on the side adjacent to the backface 23 and a sensor unit engaging surface 13a on the side adjacent the abutment surface 19. Of course, the surfaces 13a and 13c need not curve smoothly away from the protrusion 13b, but could instead simply be chamfered to provide straight tapering surfaces. When the bearing unit engaging surface 12 engages the sensor unit engaging surface 13a, the lip 22 is positively retained between the surface 13a and the abutment surface 19 because the surface 13a tapers radially inwardly away from the small radial protrusion 13b.

Prior to mounting the combined bearing and sensor assembly 30,40 onto the axle tube 50, the coupling ring 10 is clipped into the inner raceway groove 11, by elastic deformation, in a radial sense, of the lip 22 such that the bearing unit engaging surface 12 passes over the radial protrusion 13b and onto the sensor unit engaging surface 13a. The elastic deformation may be caused simply by pushing the sensor unit 30 onto the bearing unit 40, with the radially outwardly tapering portion 12b of the surface 12 cooperating with the cam surface 13c to deflect the lip 22 radially outwardly. The sensor coupling ring 10 is designed to deform elastically in a maximum radial manner to allow the minimum internal clipping diameter 14 of the sensor coupling ring 10 to expand to just larger than the maximum external diameter 15 of the radial protrusion 13b.

Once the engaging surface 12 has passed over the radial protrusion 13b, the lip 22 snaps back, radially inwardly, approximately to its original state. The minimum internal clipping diameter 14 is then less than the maximum external diameter 15 of the radial protrusion 13b so that the lip 22 is axially constrained between the radial protrusion 13b and the abutment surface 19. The coupling ring 10 may be configured such that an interference fit is created between the radially inwardly tapering portion 12a, of the bearing unit engaging surface 12, and the sensor unit engaging surface 13a; alternatively, however, the coupling ring may be configured such that the fit within the groove 11 is loose to allow for free axial rotation between the sensor unit 30 and the bearing unit 40. It is in this arrangement that the combined bearing and sensor assembly may be shipped and stored.

If an interference fit is created between the portion 12a and the sensor unit engaging surface 13a, each of which tapers radially inwardly, at clipping angles 16 and 17 respectively, in an axially outward direction (i.e. from left to right as shown in FIG. 1), a bias is generated which acts to further prevent the sensor coupling ring 10 from becoming disengaged from the inner raceway 18 during shipping and handling.

To mount the combined bearing and sensor assembly 30,40 onto the axle tube spindle 9, the first portion 5 of the coupling ring 10 is driven onto the axle tube shoulder 8, creating an interference fit between the internal and external surfaces of these elements respectively. The axially facing abutment surface 19 transmits an axial force to the coupling ring 10 via the lip 22 to force the coupling ring 10 onto the axle tube shoulder 8 without causing buckling of the coupling ring 10. The relationship between the axially facing abutment surface 19 and the backface 23 of the inner race 18 which locates against the axially outward facing surface 8b of the shoulder 8, ensures the positioning of the coupling ring 10 in the correct place on the radially outward facing surface 8a of the shoulder 8 so as to establish the desired air gap 2 between the sensor 3 and the tone ring 4 in the mounted condition. In addition, the stop means 22b presses against the opposing, axially outward facing surface 8b of the shoulder 8 to ensure that the abutment surface 22a is constantly in abutment with the reference surface 19.

The interference fit between the coupling ring 10 and the shoulder 8 causes the internal clipping diameter 14 of the coupling ring 10 to expand radially such that any interference fit condition between the engaging surfaces 12a, 13a is broken, and the internal clipping diameter 14 is expanded to clear the maximum external diameter 15 of the radial protrusion 13b.

During routine maintenance, the anti-friction bearing unit 40 with the tone ring 4 can be removed from the axle tube spindle 9 without substantially disturbing the sensor unit 30 by virtue of the radial expansion of the internal clipping diameter 14 to substantially clear the external diameter of the radial protrusion 13b. Although statistical tolerancing and manufacturing process variations may result in a residual interference between the engaging surface 12 and the radial protrusion 13b during separation of the bearing unit 40 from the sensor unit 30, the interference fit between the first portion 5 and the radially outward facing surface 8a of the shoulder 8, resists forces generated by any such residual interference, when the bearing unit 40 is removed from the axle tube spindle 9.

After routine maintenance, the bearing unit 40 may be remounted onto the axle tube spindle 9, the clearance between the internal clipping diameter 14 and the maximum external radial protrusion diameter 15 allowing the tone ring 4 to be brought back into the correct position to re-establish the desired air gap 2. This happens automatically when the axially facing abutment surface 19 and the inner race backface 23 are brought into contact with the lip 22 and the axially outward facing surface 8b of the shoulder 8 respectively. As before, any residual interference during remounting between the surfaces 12 and 13 is not sufficient to overcome the interference fit during the first portion 5 and the radially outward facing surface 8a.

Similarly, the magnitude of the interference fit between the first portion 5 and the radially outward facing surface 8a of the shoulder 8 is sufficient to prevent any creeping of the inner race 18 from being transmitted to the sensor unit 30.

Figure 5:
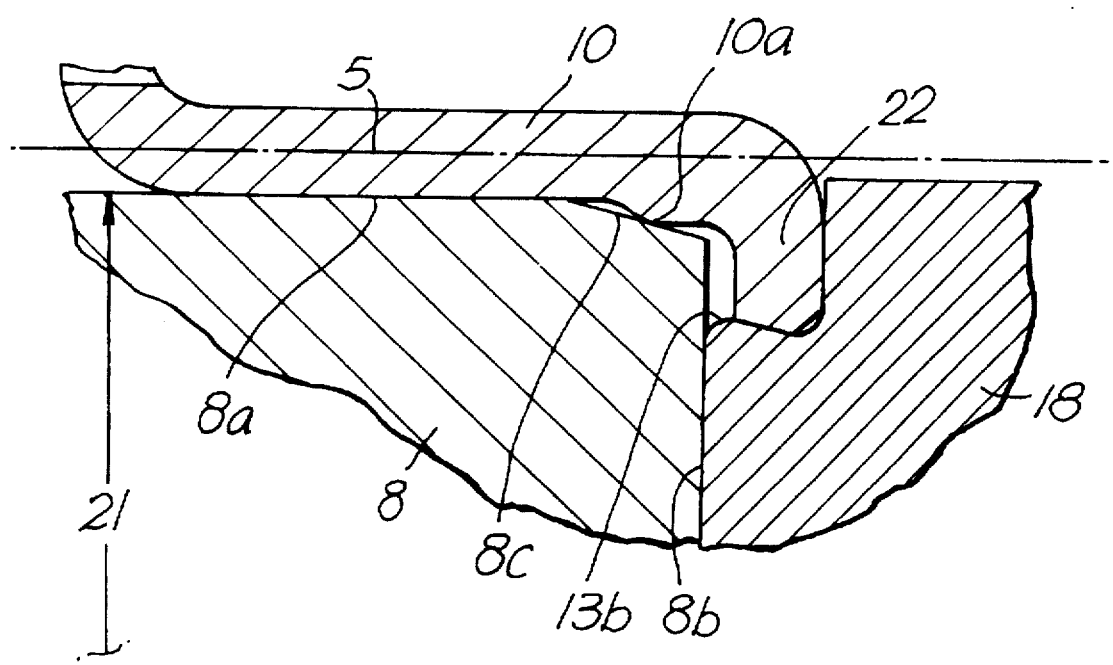
FIG. 5 is similar to FIG. 2 but shows another embodiment of a combined bearing and sensor assembly according to the present invention.

Referring now to FIG. 5, the coupling ring 10 is shown with a dedicated cam surface 10a provided on the first portion 5 towards its axially outer end adjacent to where the lip 22 is formed. This dedicated cam surface 10a serves to assist in the radial expansion of the lip 22 during mounting of the combined bearing and sensor assembly onto an axle or axle tube. Since the cam surface 10a cooperates with a tapered surface 8c on the shoulder 8 of the axle tube 50, the dedicated cam surface 10a does not adversely affect the interference fit between the coupling ring 10 and the radially outward facing surface 8a of the shoulder 8.

Figure 6:
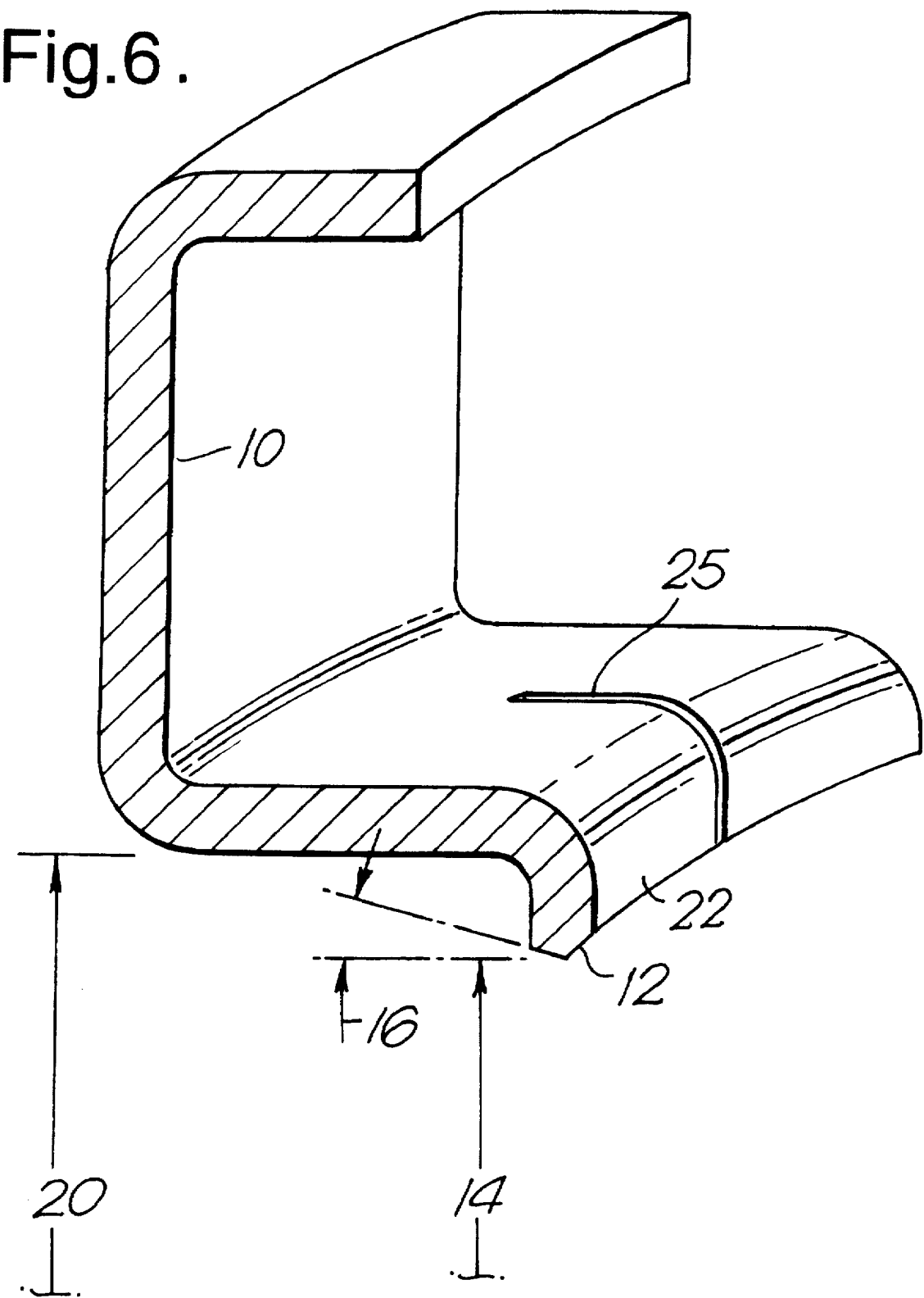
FIG. 6 is a perspective view of a part of a sensor coupling ring of yet another embodiment of a combined bearing and sensor assembly according to the present invention.

FIG. 6 shows a further embodiment of the coupling ring 10 in which a plurality of cuts or slices 25 have been formed extending axially inwardly from the outer end of the coupling ring 10 thereby dividing the coupling ring 10 into interconnected tabs. Although these cuts 25 are shown as extending only partially into the first portion 5, they could extend as far or as little into the first portion as desired. The purpose of the tabs is to introduce greater freedom of deformation of the bearing unit engaging means, thus easing the assembly of the coupling ring 10 into the inner raceway groove 11 and facilitating the radial expansion of the lip 22 which prompts the disengagement of the bearing unit and inner race groove engagement surfaces 12 and 13.

Figure 7:
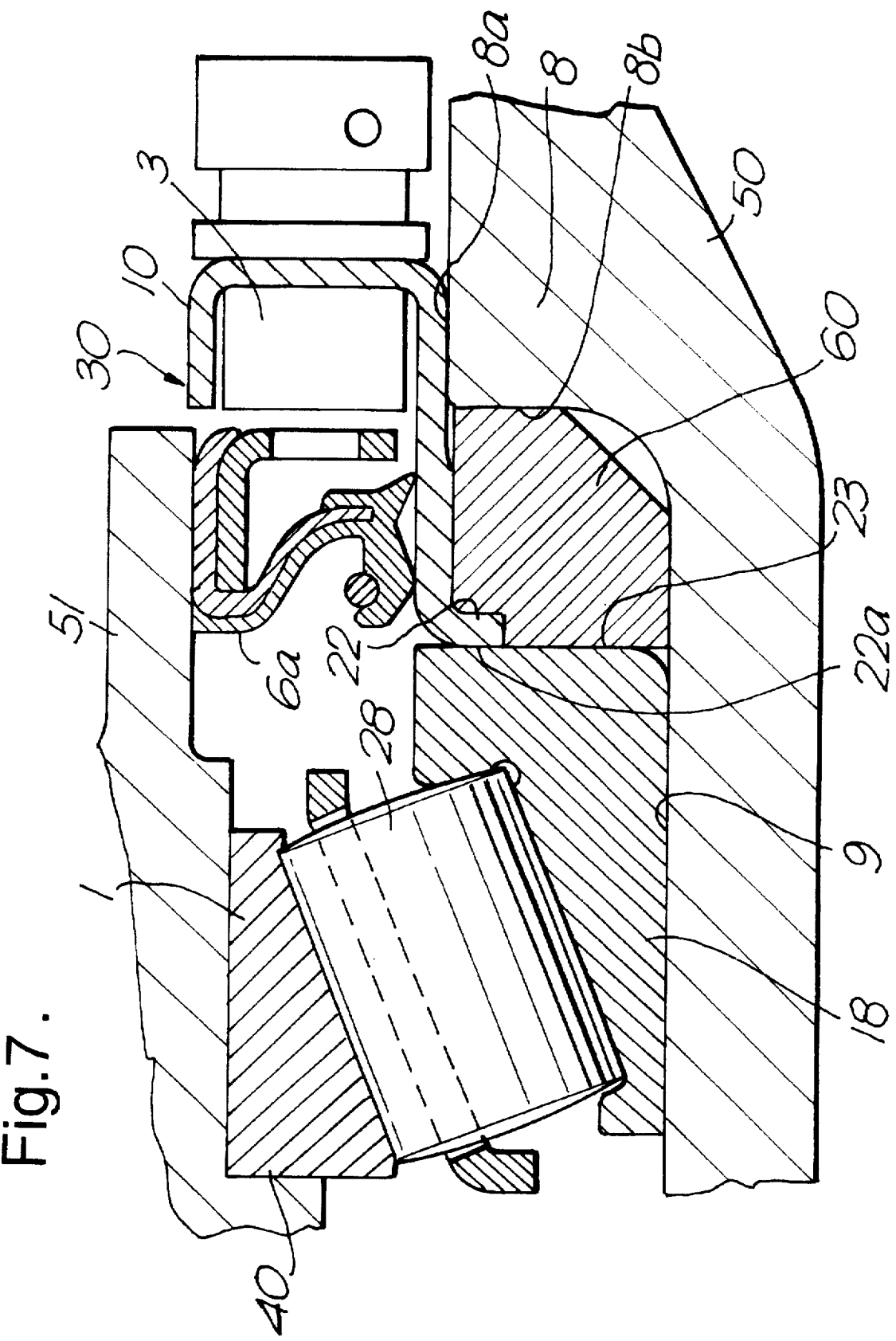
FIG. 7 is a diagrammatical cross-sectional view of still another combined bearing and sensor assembly according to the present invention.

FIG. 7 shoes a further embodiment of the present invention in which a unitized bearing comprising an outer race 1, an inner race 18 and a plurality of rollers 28 is shown in lieu of the packaged bearing unit shown in FIG. 1. Since a unitized bearing is used in this embodiment, a slightly different seal 6a is used, and it is located not between the races 1 and 18 as was the case in FIG. 1, but instead it is located between the hub 51 and the axle tube 50. The seal 6a is press fitted into the hub 51 for rotation therewith. Furthermore, an intermediate member in the form of a carrier ring 60 is shown located axially between the backface 23 of the inner race 18 and the opposing surface 8b of the mounting surface 8a, 8b, 9 which, as before, is split up into a bearing unit mounting surface 9, a sensor unit mounting surface 8a and an opposing surface 8b.

In this embodiment, there is no bearing unit engaging means formed on the lip 22 of the coupling ring 10, nor is there any sensor unit engaging means formed on the bearing unit 40. Instead, the coupling ring 10 engages with the carrier ring 60. The carrier ring 60 and sensor 30 may be sold, shipped and mounted either together or separately. As before, the lip 22 acts as an axial anchorage means and has stop means (not shown) formed on the axially inward facing surface thereof for cooperating with the opposing surface 8b of the mounting surface 8a, 8b, 9, in this case via the carrier ring 60, to maintain the abutment surface 22a formed on the lip 22 in constant abutment with the reference surface in this case formed by the backface 23 of the inner race 18. It can be seen that in this embodiment an end groove has been formed not in the inner race 18, but instead in the carrier ring 60. Nonetheless, the effect in terms of providing an anchorage for the radial lip 22 while permitting the abutment surface 22a to be urged into constant abutment with the reference surface at the same time as permitting the bearing unit 40 to be dismounted from the bearing unit mounting surface 9 without disturbing the sensor unit 30, is similar to the effect of the arrangement shown in FIG. 1.

Figure 8:
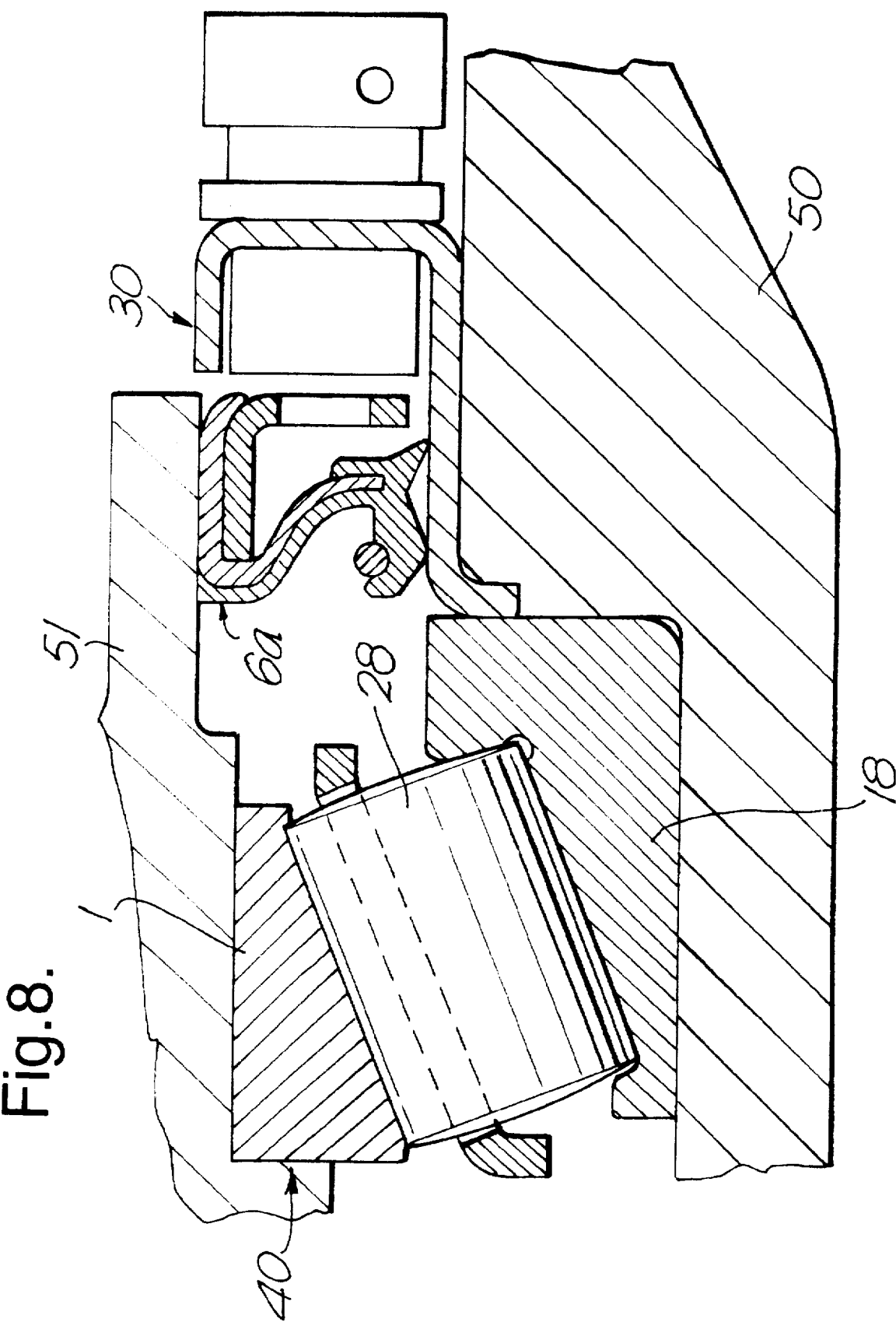
FIG. 8 is a diagrammatical cross-sectional view of yet another combined bearing and sensor assembly according to the present invention.

FIG. 8 shows an embodiment which is very similar to that of FIG. 7 except that in this embodiment there is no carrier ring. The bearing unit 40 is again a unitized bearing unit, and thus the seal 6a is the same as in FIG. 7. Again there is no end groove formed in the inner race 18, and instead an end groove is formed directly in the axle tube 50. In this case, the majority of the axial stress between the bearing unit 40 and the axle tube 50 is take across the boundary between these two items radially inwardly of the bottom of the end groove formed in the axle tube 50.

Figure 9:
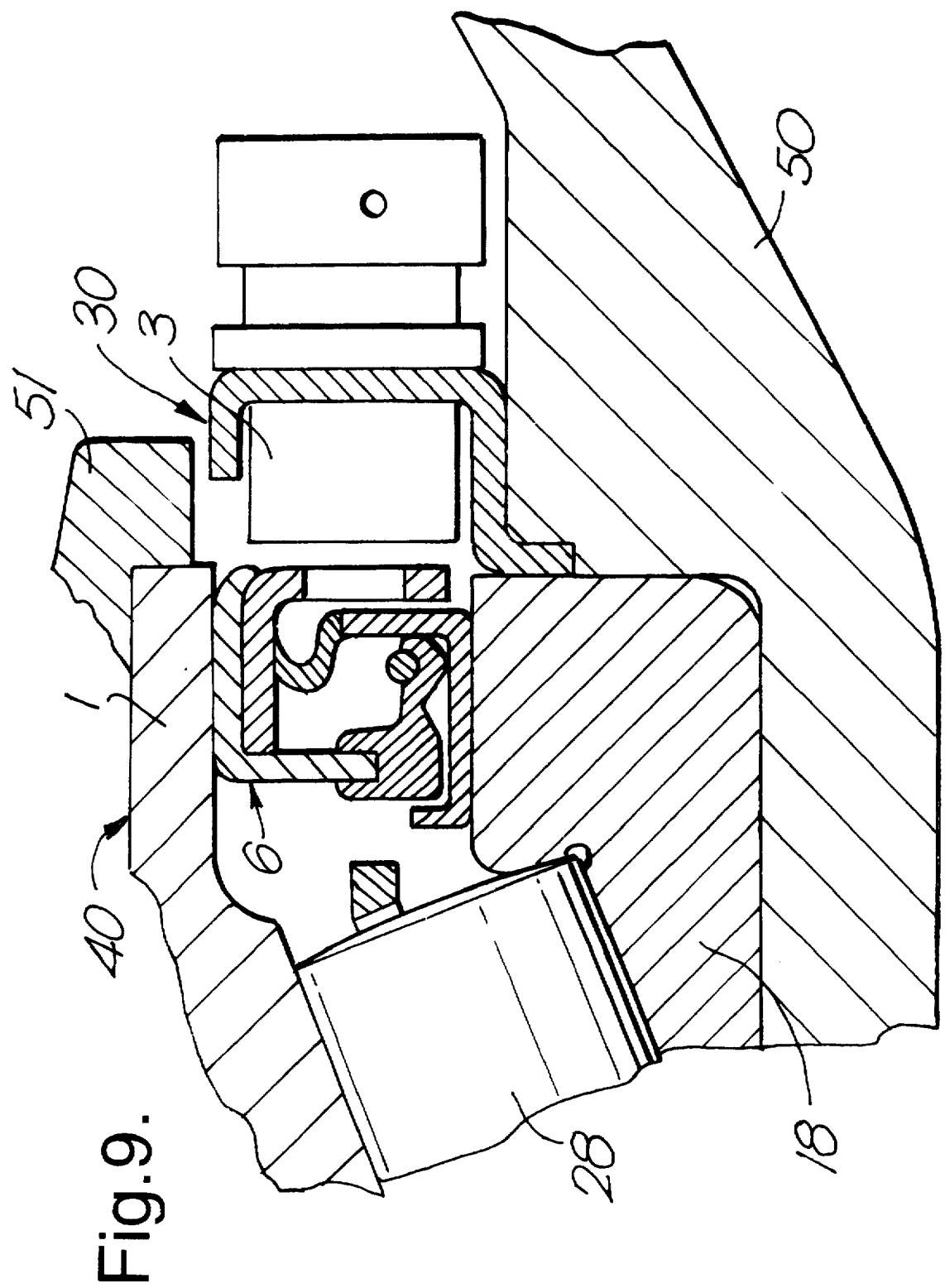
FIG. 9 is a diagrammatical cross-sectional view of yet another combined bearing and sensor assembly according to the present invention.

Finally, FIG. 9 shows a further embodiment of the present invention in which a packaged bearing unit 40 is used as was the case in the embodiment shown in FIG. 1 such that a seal 6 is used as before which is located between the inner race 18 and outer 1 race. The main difference between this embodiment and that shown in FIG. 1 is that an end groove has been formed not in the inner race 18 but in the axle tube 50. As discussed above in relation to FIGS. 7 and 8, the main effect of this movement of the end groove is that the sensor unit 30 can no longer clip on to the bearing unit when the assembly is not mounted on the mounting surface 8a, 8b, 9 (e.g. during shipping and handling). In all other respects, however, the arrangement functions in almost exactly the same way as in the embodiment shown in FIG. 1.

The foregoing description of currently preferred embodiments of the present invention are not meant to be limiting. In particular, although steel is a suitable material from which to manufacture for example the sensor coupling ring, other materials having sufficient strength, flexibility and durability may also be used. This is also true of most of the other components of the bearing and sensor assembly. Similarly, although the described embodiments relate to a combined bearing and sensor assembly in which the outer raceway rotates, the invention is also applicable to an assembly in which the inner raceway rotates and the outer raceway and sensor unit are mounted within a fixed bearing housing, the tone ring being attached to the inner raceway and all features such as the sensor and bearing unit engaging surfaces being radially inverted. Other adaptations and modifications to the described embodiment will be apparent to those skilled in the art which will none-the-less fall within the scope of the present invention as set out in the claims below.

What is claimed is:

1. The combination comprising: a bearing mount having a shoulder which creates a generally radially directed surface and a generally axially directed surface that leads up to the large end of the radially directed surface; a first bearing race fitted to the bearing mount against the radially directed surface of the shoulder and having a radially directed surface presented toward the radially directed surface on the bearing mount; one of the radially directed surfaces having its periphery along a groove that opens axially and radially and is along a radial abutment surface; a second race located concentrically with respect to the first race; rolling elements located between the first and second races so that the second race rotates relative to the first race; a tone ring mounted in a fixed position with respect to the second race and rotatable with it; a coupling ring fitted to the bearing mount at the axially directed surface on the bearing mount, the coupling ring further extending to the first race and being provided with a radially directed segment which projects into the groove and is captured in the groove; the radially directed segment being as wide as the groove, so that the coupling ring cannot move axially on the bearing mount; and a speed sensor carried by the coupling ring in a fixed position on the coupling ring, the speed sensor being presented toward the tone ring and having the capacity to produce a signal in response to rotation of the tone ring, with the signal reflecting the angular velocity of the tone ring.

2. The combination according to claim 1 wherein the radially directed segment on the coupling ring is deformable axially and is deformed axially to match the width of the groove.

3. The combination according to claim 2 wherein the groove is in the first race and the radial abutment surface is on the first race and is located opposite to the radially directed surface of the shredder.

4. The combination according to claim 1 wherein the radially directed segment of the coupling ring includes a radially directed lip on the coupling ring, with the lip being generally narrower than the groove; wherein the lip has axially directed stops along it which, when unrestrained, give the lip a width greater than the width of the groove; and wherein the stops are deformed in the groove to maintain the lip against the radial abutment surface, so that the coupling ring does not migrate axially on the bearing mount.

5. A sensor unit for installation on a bearing mount adjacent to a bearing that is on the mount, with the bearing including an inner race, an outer race and rolling elements between the races, and the outer race carrying a tone ring, said sensor unit comprising: a coupling ring having an axially extending portion configured to fit on the bearing mount and a lip directed radially from the axially extending portion, the lip including axially directed portions located at circumferential intervals along the lip, with the axially directed portions being deformable to axially to match the width of the lip to the width of a groove when the lip projects into the groove; and a sensor carried by the coupling ring to monitor rotation of the tone ring.

6. A method of mounting a bearing assembly onto a mounting surface (8a, 8b, 9) comprising the steps of releasably engaging a sensor unit (30) having a sensor (3) to a bearing unit (40) having a tone ring (4) so as to maintain a fixed gap (2) between the sensor (3) and the tone ring (4), the bearing unit (40) and the sensor unit (30) together forming a combined bearing and sensor assembly, and mounting the combined bearing and sensor assembly on the mounting surface (8a, 8b, 9), said sensor unit (30) being provided with bearing unit engaging means (12) and with preferential mounting surface engaging means (5), deflecting the bearing unit engaging means (12) simultaneously with the step of mounting the combined bearing and sensor assembly, such that the engagement between the sensor unit (3) and the bearing unit (40) is weakened while the engagement between the combined bearing and sensor assembly and the mounting surface (8a, 9) is increased, whereby the bearing unit (40) may be dismounted from and remounted onto the mounting surface (9) without disturbing the sensor unit (30).

7. A combined bearing and sensor assembly for mounting on a mounting surface (8a, 8b, 9), said assembly comprising: a bearing unit (40) which includes sensor unit engaging means (11), and a sensor unit (30) which includes a sensor coupling ring (10) having bearing unit engaging means (12), the sensor coupling ring (10) further having preferential mounting surface engaging means (5); whereby said sensor unit engaging means (11) engages with said bearing unit engaging means (12) when said combined bearing and sensor assembly is not mounted on the mounting surface (8a, 8b, 9), and said sensor coupling ring (10) engages with a portion (8a) of the mounting surface (8a, 8b, 9) in preference to the bearing unit (40) when said combined bearing and sensor assembly is mounted on the mounting surface (8a, 8b, 9), said sensor coupling ring (10) engaging the portion (8a) of the mounting surface (8a, 8b, 9) by means of said preferential mounting surface engaging means (5), thus allowing said bearing unit (30) to be dismounted from and re-mounted onto another portion (9) of said mounting surface (8a, 8b, 9) without removal or substantial disturbance of the sensor unit (30), the preferential mounting surface engaging means (5) being connected to the bearing unit engaging means (12) such that the engagement between the bearing unit (40) and the sensor unit (30) is at least weakened as the combined bearing and sensor assembly is mounted on the mounting surface (8a, 8b, 9).

8. A combined bearing and sensor assembly according to claim 7 wherein the bearing unit engaging means (12) is formed on a substantially radially directed lip (22) formed on the coupling ring (10).

9. A combined bearing and sensor assembly according to claim 7 wherein a dedicated cam surface (10a) is formed on the preferential mounting surface engaging means, whereby the weakening of the engagement between the bearing unit (40) and the sensor unit (30) as the combined bearing and sensor assembly is mounted on a mounting surface is enhanced.

10. A combined bearing and sensor assembly for mounting on a mounting surface (8a, 8b, 9), said assembly comprising: a bearing unit (40) which includes a tone ring (4) and sensor unit engaging means (11), and a sensor unit (30) which includes a sensor (3) and a sensor coupling ring (10) having bearing unit engaging means (12), the sensor coupling ring (10) further having preferential mounting surface engaging means (5); whereby said sensor unit engaging means (11) engages with said bearing unit engaging means (12) when said combined bearing and sensor assembly is not mounted on a mounting surface (8a, 9b, 9), and said sensor coupling ring (10) engages with a portion (8a) of the mounting surface (8a, 8b, 9) in preference to the bearing unit (40) when said combined bearing and sensor assembly is mounted on a mounting surface (8a, 8b, 9), said sensor coupling ring (10) engaging the portion (8a) of the mounting surface (8a, 8b, 9) by means of said preferential mounting surface engaging means (5), thus allowing said bearing unit (30) to be dismounted from and re-mounted onto another portion (9) of said mounting surface (8a, 8b, 9) without removal or substantial disturbance of the sensor unit (30), the sensor unit (30) further including stop means (22b) for preventing the sensor unit (30) from moving too far onto the portion (8a) of the mounting surface (8a, 8b, 9) during mounting of the sensor unit (30) and during the operation of the bearing unit (40), whereby the stop means (22b) acts to maintain a predetermined gap (2) between the tone ring (4) and the sensor (3).

11. A combined bearing and sensor assembly according to claim 10 wherein the stop means (22b) comprises at least one axially extending projection (22b) directed away from the bearing unit (40) and formed on a substantially radially directed lip (22) that is on the coupling ring (10).

12. A combined bearing and sensor assembly according to claim 10 wherein the coupling ring (10) has a plurality of slits (25) extending axially away from the bearing unit (40) from the outer end of the coupling ring (10), whereby a plurality of inter-connecting tabs are formed in the coupling ring (10) which extend towards the bearing unit (40).

13. A combined bearing and sensor assembly for mounting on a mounting surface (8a, 8b, 9), the assembly comprising a bearing unit (40) including a tone ring (4) and a reference surface (19) having a fixed axial relationship to the tone ring (4); and a sensor unit (30) including an axial sensor (3) and a sensor coupling ring (10); the sensor (3) being presented toward the tone ring (4) with an axial zap (2) between the sensor (3) and ring (4); the sensor coupling ring (10) including an abutment surface (22a), having a fixed axial relationship to the sensor (3), for abutment with the reference surface (19), preferential mounting surface engaging means (5) for enabling the bearing unit (40) to be dismounted from and re-mounted onto the mounting surface (8a, 8b, 9) without removal or substantial disturbance of the sensor unit (30), and axial anchorage means (22), wherein the axial anchorage means (22) cooperates with the mounting surface (8a, 8b, 9) to ensure that the abutment surface (22a) of the coupling ring (10) remains in abutment with the reference surface (19) of the bearing unit (40) when the sensor unit (30) and the bearing unit (40) have been correctly mounted even after substantial operation of the combined bearing and sensor assembly, whereby the axial gap (2) between the sensor (3) and the tone ring (4) is maintained substantially constant.

14. A combined bearing and sensor assembly according to claim 13 further comprising an intermediate member (60) located axially between the backface (23) of the bearing unit (40) and an opposing surface (8b) formed on the mounting surface (8a, 8b, 9).

15. A combined bearing and sensor assembly according to claim 13 wherein the abutment surface (22a) is formed on the axial anchorage means (22).

16. A combined bearing and sensor assembly according to claim 13 wherein the axial anchorage means (22) includes stop means (22b) having a limited amount of give for cooperating with the mounting surface (8a, 8b, 9) to take up any excess axial freedom of movement of the sensor unit (30) when the assembly is correctly mounted on the mounting surface (8a, 8b, 9).

17. The combination comprising: a bearing mount having a shoulder which creates a generally radially directed surface and a generally axially directed surface that leads up to the large end of the radially directed surface; a first bearing race fitted to the bearing mount against the radially directed surface of the shoulder and having a radially directed surface presented toward the radially directed surface on the bearing mount; one of the radially directed surfaces having its periphery along a groove that opens axially and radially and is along a radial abutment surface; a second race located concentrically with respect to the first race; rolling elements located between the first and second races so that the second race rotates relative to the first race: a tone ring mounted in a fixed position with respect to the second race and rotatable with it; a coupling ring fitted to the bearing mount at the axially directed surface on the bearing mount and engaged with the bearing mount, the coupling ring further extending to the first race where it is provided with a radially directed lip which projects into the groove and is against the abutment surface; and a speed sensor carried by the coupling ring and presented toward the tone ring, the speed sensor having the capacity to produce a signal in response to rotation of the tone ring, with the signal reflecting the angular velocity of the tone ring.

18. The combination according to claim 17 wherein the coupling ring has an axially extending wall which lies along the axially directed surface of the bearing mount, there being an interference fit between the two, and terminates at the lip.

19. The combination according to claim 18 wherein the groove 18 is in the first race.

20. The combination according to claim 17 wherein the coupling ring at its lip is also engaged with the first race; and wherein the engagement between the coupling ring and the bearing mount is sufficient to overcome the engagement between the coupling ring and the first race, so that when the first race is removed from the bearing mount, the coupling ring and sensor will remain with the bearing mount.

21. The combination according to claim 17 wherein the lip has axially directed stops along it which, when unrestrained, give the lip a width greater than the width of the groove; and wherein the stops are deformed in the groove to maintain the lip against the radial abutment surface, so that the coupling ring does not migrate axially on the bearing mount.

* * * * *